US012785506B2

(12) United States Patent
Neufeld

(10) Patent No.: US 12,785,506 B2
(45) Date of Patent: Nov. 3, 2026

(54) METHOD OF INTEGRATING A GENERATOR AND ACTIVE RECTIFIER FOR USE WITH A WATER-BASED ENERGY CAPTURING DEVICE TO INCREASE ELECTRICAL TRANSMISSION EFFICIENCY AND PERFORMANCE

(71) Applicant: Dragon Engineering Ltd., Cooks Creek (CA)

(72) Inventor: Derek Neufeld, Cooks Creek (CA)

(73) Assignee: Dragon Engineering Ltd., Cooks Creek (CA)

(*) Notice: Subject to any disclaimer, the term of this patent is extended or adjusted under 35 U.S.C. 154(b) by 170 days.

(21) Appl. No.: 18/930,652

(22) Filed: Oct. 29, 2024

(65) Prior Publication Data

US 2025/0125683 A1 Apr. 17, 2025

Related U.S. Application Data

(63) Continuation-in-part of application No. 18/308,142, filed on Apr. 27, 2023, now abandoned.

(51) Int. Cl.
*H02K 7/18* (2006.01)
*H02K 5/10* (2006.01)
*H02K 5/12* (2006.01)

(52) U.S. Cl.
CPC ............. *H02K 7/1807* (2013.01); *H02K 5/10* (2013.01); *H02K 5/12* (2013.01)

(58) Field of Classification Search
CPC ........... H02K 7/1807; H02K 5/10; H02K 5/12
See application file for complete search history.

(56) References Cited

U.S. PATENT DOCUMENTS 3,242,250 A * 3/1966 Brzezinski ................ H01F 7/06 174/12 R
4,790,370 A * 12/1988 Niggemann .......... H10W 40/43 165/41

(Continued)

FOREIGN PATENT DOCUMENTS

CA 3090146 8/2019
RU 2516470 5/2014

(Continued)

OTHER PUBLICATIONS

RU-2516470-C2 Machine Translation (Year: 2014).*
WO-2021172998-A1 Machine Translation (Year: 2021).*

*Primary Examiner* — Oluseye Iwarere
*Assistant Examiner* — Masoud Vaziri
(74) *Attorney, Agent, or Firm* — Michael R. Williams; Ryan W. Depuis; Ade & Company Inc

(57) ABSTRACT

A method is disclosed for an innovative assembly of the electrical conditioning system connected to a water-based energy capturing device such as wave, hydrokinetic, or tidal machines to increase the efficiency of electrical power transmission between the energy capturing assembly and a load. The assembly favors the use of an active rectifier as the electrical conditioning system to provide both rectification and voltage regulation in a single system. The active rectifier can be configured to output a higher direct current (DC) bus voltage compared to passive rectifier solutions that both decrease the required size of the transmission cable conductors and transmission losses. The disclosure further details a method for installation of the active rectifier and the energy capturing device's generator within a waterproof enclosure so that the electrical conditioning system can be installed at the location of the energy capturing device, either near the surface of the water or below the surface of the water, while increasing thermal regulation capabilities of the electrical (Continued)

system components through the integration of a fluid to fill the cavity around the active rectifier and generator within the waterproof enclosure.

3 Claims, 3 Drawing Sheets

(56) References Cited

U.S. PATENT DOCUMENTS

| | | | | | |
|---|---|---|---|---|---|
| 6,037,537 | A * | 3/2000 | McShane | C09K 5/10<br>174/17 LF |
| 2009/0121200 | A1 | 5/2009 | Bates | |
| 2013/0169055 | A1 * | 7/2013 | Bats | H02J 3/38<br>307/84 |
| 2019/0199128 | A1 * | 6/2019 | Neufeld | F03B 15/00 |
| 2020/0295671 | A1 * | 9/2020 | Huynh | H02J 3/381 |
| 2022/0077798 | A1 * | 3/2022 | Kalra | F01D 15/10 |

FOREIGN PATENT DOCUMENTS

| | | | | |
|---|---|---|---|---|
| RU | 2516470 | C2 * | 5/2014 | H01B 3/22 |
| WO | WO-2021172998 | A1 * | 9/2021 | F03B 13/20 |

* cited by examiner

METHOD OF INTEGRATING A GENERATOR AND ACTIVE RECTIFIER FOR USE WITH A WATER-BASED ENERGY CAPTURING DEVICE TO INCREASE ELECTRICAL TRANSMISSION EFFICIENCY AND PERFORMANCE

PRIOR APPLICATION INFORMATION

The instant application is a continuation-in-part application of U.S. patent application Ser. No. 18/308,142, filed Apr. 27, 2023, entitled "A METHOD OF INTEGRATING A GENERATOR AND ACTIVE RECTIFIER FOR USE WITH A WATER-BASED ENERGY CAPTURING DEVICE TO INCREASE ELECTRICAL TRANSMISSION EFFICIENCY AND PERFORMANCE", the entire contents of which are hereby incorporated by reference for all purposes, which claimed priority to Canadian Patent Application serial number 3,160,382, filed Apr. 29, 2022, entitled "A method of integrating a generator and active rectifier for use with a water-based energy capturing device to increase electrical transmission efficiency and performance", the entire contents of which are incorporated herein by reference for all purposes.

FIELD OF THE INVENTION

The invention relates generally to the field of electrical power production.

BACKGROUND OF THE INVENTION

The present invention is directed to water-based energy capturing devices, such as wave, hydrokinetic, or tidal machines which are geographically located in a waterway at a distance from shore and typically located at or below the surface of the water.

There are many locations around the world where it is desirable to convert mechanical energy from waves, rivers, and tides into electrical energy for either adding electrical generation capacity to an existing electrical grid or to form a micro-grid in a remote location. One of the challenges that manufacturers of equipment used to convert mechanical energy from water into electrical energy face is efficiently transporting the produced electrical energy from the water-based machine to a location on shore where electrical equipment conditions the electrical energy to the correct voltage and frequency for the load.

Water-based energy capturing devices are typically comprised of a prime mover which converts fluid motion into linear motion or rotational motion and a generator that converts the linear motion or rotational motion into electrical energy. Since the relative rate of motion between the water and the prime mover varies with tides, seasons, lunar motion, winds, precipitation, etc., the rate of generator motion also varies. Variation in the rate of generator motion results in variation in the produced voltage and frequency from the generator. An electrical conditioning system is required to convert the electrical energy containing variable voltage and frequency from the generator to electrical energy with fixed voltage or fixed voltage and frequency as required by the electrical load in the case of a direct current (DC) load or alternating current (AC) load respectively.

Electrical conditioning systems and components used for conditioning the electrical energy from generators are known in the art. In a conventional electrical conditioning system, the output of the generator passes through two devices to produce conditioned electrical energy. Depending on whether the electrical load requires alternating current (AC) or direct current (DC) electrical energy, the second device may have two embodiments. The first device uses diodes to convert the alternating polarity of the electrical energy to constant polarity and then uses capacitors to convert the frequency of the electrical energy from a variable value to zero; this is referred to as rectification. The output of the first device is typically referred to as the variable voltage direct current (DC) bus. The direct current (DC) bus is then passed to the second device. In the case of the electrical load requiring direct current (DC) electrical energy, the second device receives variable voltage from the direct current (DC) bus at its input terminals and converts that electrical energy to constant voltage, as required by the electrical load, which is available at its output terminals. This is referred to as voltage conditioning. In the case of the electrical load requiring alternating current (AC) electricity, the second device receives variable voltage from the direct current (DC) bus at its input terminals and converts that electrical energy to constant voltage and constant frequency, as required by the electrical load, which is available at its output terminals. This is referred to as voltage and frequency conditioning. Collectively, rectification and voltage conditioning or voltage and frequency conditioning are referred to as electrical conditioning.

The load that uses the electrical energy produced by the energy capturing device is typically located on shore. The voltage conditioner or the voltage and frequency conditioner portion of the electrical conditioning system is also typically located on shore, while the rectifier may be located either at the location of the energy capturing device or on shore with the voltage conditioner or voltage and frequency conditioner. Due to the geographic separation between the energy capturing device and the shore, a transmission cable must be used to transport the electrical energy from the energy capturing device located in the waterway to shore. In the event the rectifier is located on shore, the transmission cable is said to transmit wild alternating current (AC), alternating current with variable voltage and variable frequency. In the event the rectifier is located near to the energy capturing device, the transmission cable is said to transmit rectified direct current (DC), direct current with variable voltage. The voltage conditioner or voltage and frequency conditioner, as well as the load, are typically located on shore.

All of the electrical conditioning system components, including the rectifier and voltage conditioner or voltage and frequency conditioner produce heat during operation and contain semiconductor components. Failure of the semiconductor components used within these devices occurs if the temperature rises too high. The cooling capability of air is reduced as altitude increases, which further increases the probability of failure due to high temperature. To avoid failure, placement of the rectifier and voltage converter or voltage and frequency converter to avoid solar heating must be selective, often requiring a sun shelter or shading system. This increases the installation complexity of the electrical conditioning system. High altitude installation of electrical conditioning system equipment requires derating of the components' maximum power capabilities to account for decreased heat transfer capabilities with the surrounding air.

SUMMARY OF THE INVENTION

The embodiments of the present disclosure relate to an innovative assembly of an electrical conditioning system and an energy capturing device located in a waterway at some distance from shore and either at the surface of the waterway or below the surface of the waterway.

The energy capturing device captures mechanical energy from moving water, such as wave, river, or tidal sources and converts that mechanical energy into electrical input energy using a prime mover which converts fluid motion into linear motion or rotational motion and a generator that converts the linear motion or rotational motion into electrical energy.

The electrical conditioning system uses an active rectifier which offers high rectification efficiency combined with programmable voltage regulation capabilities. The electrical conditioning system includes an input terminal, an output terminal, and an active rectifier circuit. The electrical energy output from the energy capturing device is connected to the input terminals of the electrical conditioning system. Once the electrical energy passes through the input terminals of the electrical conditioning system, it passes through the active rectifier circuit which efficiently converts alternating current (AC) electricity to direct current (DC) electricity and regulates the voltage of the direct current (DC) electricity output.

The active rectifier is located near or affixed to the generator used in the energy capturing device and both the components are sealed within a waterproof housing. The waterproof housing may be filled with a low viscosity fluid that is both electrically insulative and thermally conductive to increase the rate of heat dissipation from both the active rectifier and the generator. Installation of the waterproof housing near the surface of the waterway or below the surface of the waterway permits efficient heat transfer to the ambient environment while providing protection to the electrical conditioning system from solar heating. A waterproof connection is used to bring the electrical conditioning system terminals to the outside of the waterproof housing to enable interconnection with a transmission cable.

The output from the energy conditioning device is then connected to a transmission cable which spans the distance between the energy capturing device and energy conditioning system assembly located in the waterway, and the load. The load can be located on shore or at a location on the waterway. By configuring the electrical conditioning system to provide an output terminal voltage greater than the output voltage of the energy capturing device generator, the required cross-section of the transmission cable conductors can be decreased and power loss through transmission decreased.

According to a first aspect of the invention, there is provided an energy capturing device comprising:

- a generator for converting linear motion or rotational motion into alternating current electrical energy; and
- an electrical conditioning system comprising:
  - an input terminal;
  - an active rectifier; and
  - an output terminal;
- wherein the energy capturing device is configured such that alternating current electrical energy from the energy capturing device is passed to the input terminal of the electrical conditioning system, said alternating current electrical energy being converted on passing through the active rectifier to direct current electrical energy at the output terminal of the electrical conditioning system; and
- wherein the active rectifier and the generator are sealed in a waterproof housing, said waterproof housing being filled with a heat dissipating liquid having a thermal conductivity between 0.17 and 1.0 W/mK, a dynamic viscosity between 0 and 40 cP and a dielectric constant between 0 and 4 to dissipate heat from the active rectifier and the generator.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

A method is disclosed for an innovative assembly of the electrical conditioning system connected to a water-based energy capturing device such as wave, hydrokinetic, or tidal machines to increase the efficiency of electrical power transmission between the energy capturing assembly and a load. The assembly favors the use of an active rectifier as the electrical conditioning system to provide both rectification and voltage regulation in a single system. The active rectifier can be configured to output a higher direct current (DC) bus voltage compared to passive rectifier solutions that both decrease the required size of the transmission cable conductors and transmission losses. The disclosure further details a method for installation of the active rectifier and the energy capturing device's generator within a waterproof enclosure so that the electrical conditioning system can be installed at the location of the energy capturing device, either near the surface of the water or below the surface of the water, while increasing thermal regulation capabilities of the electrical system components through the integration of a fluid to fill the cavity around the active rectifier and generator within the waterproof enclosure.

Figure 1:
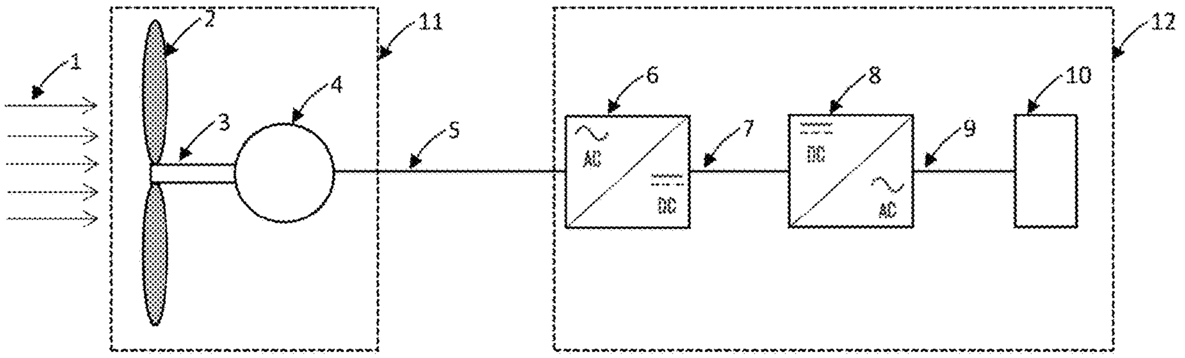
FIG. 1 shows a typical energy capturing device with generator in a waterway connected to an electrical conditioning system including a rectifier, an inverter, and a load located on shore by means of a transmission cable.

FIG. 1 shows a typical energy capturing device located in a waterway 11 comprised of a prime mover 2, a shaft 3, and a generator 4. The prime mover 2 interacts with moving water 1 to cause linear motion or rotational motion of shaft 3 which in turn produces electrical energy from generator 4. The electrical energy from the generator 4 is transmitted, by means of transmission cable 5, to a passive rectifier 6, which is located on shore 12, to produce a variable voltage direct current (DC) bus 7. The input of inverter 8 is connected to direct current (DC) bus 7 and the output of inverter 8 is an alternating current (AC) bus 9 of fixed voltage and frequency. Load 10 is energized by alternating current (AC) bus 9.

Figure 2:
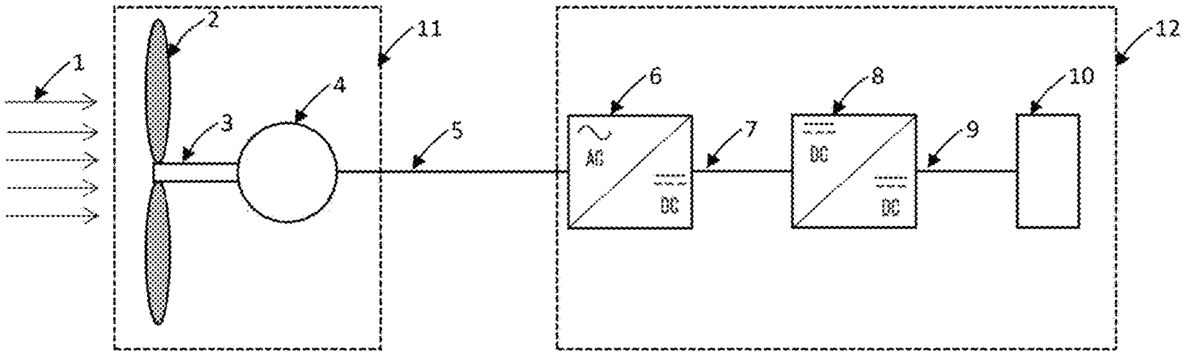
FIG. 2 shows a typical energy capturing device with generator in a waterway connected to an electrical conditioning system including a rectifier, a voltage regulator, and a load located on shore by means of a transmission cable.

FIG. 2 shows a typical energy capturing device located in a waterway 11 comprised of a prime mover 2, a shaft 3, and a generator 4. The prime mover 2 interacts with moving water 1 to cause linear motion or rotational motion of shaft 3 which in turn produces electrical energy from generator 4. The electrical energy from the generator 4 is transmitted, by means of transmission cable 5, to a passive rectifier 6, which is located on shore 12, to produce a variable voltage direct current (DC) bus 7. The input of voltage regulator 8 is connected to direct current (DC) bus 7 and the output of voltage regulator 8 is a direct current (DC) bus 9 of fixed voltage. Load 10 is energized by direct current (DC) bus 9.

Figure 3:
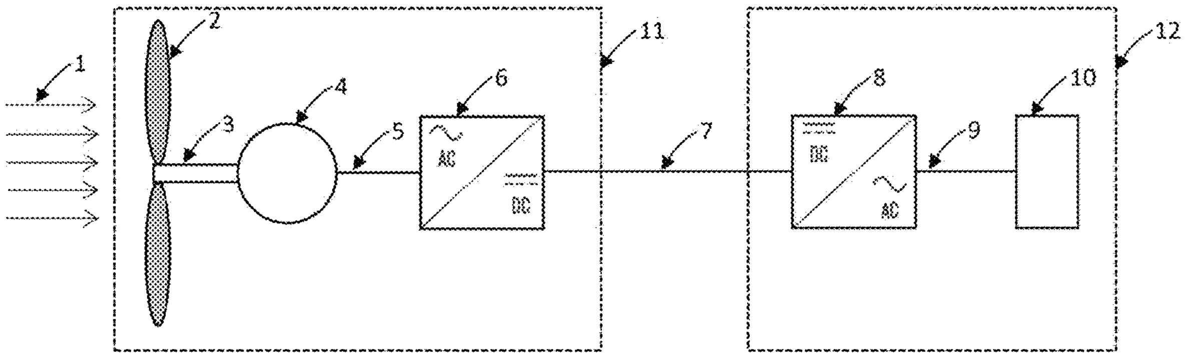
FIG. 3 shows a typical energy capturing device with generator and rectifier in a waterway connected to an electrical conditioning system including an inverter, and a load located on shore by means of a transmission cable.

FIG. 3 shows a typical energy capturing device located in a waterway 11 comprised of a prime mover 2, a shaft 3, and a generator 4. The prime mover 2 interacts with moving water 1 to cause linear motion or rotational motion of shaft 3 which in turn produces electrical energy from generator 4. The output from the generator 4 is connected to a passive rectifier 6, which is located at the generator, by means of conductor 5 to produce a variable voltage direct current (DC). The variable voltage direct current (DC) output of rectifier 6 is transmitted to inverter 8 which is located on shore 12 by means of transmission cable 7. The output of inverter 8 is an alternating current (AC) bus 9 of fixed voltage and frequency. Load 10 is energized by alternating current (AC) bus 9.

Figure 4:
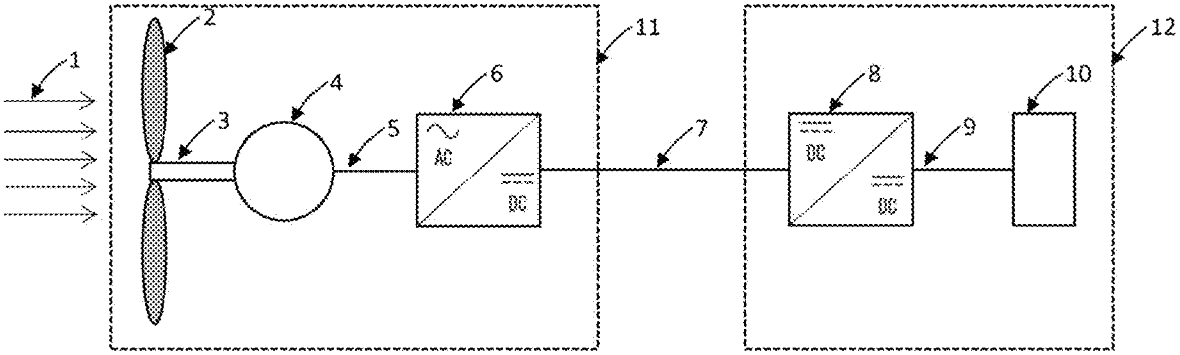
FIG. 4 shows a typical energy capturing device with generator and rectifier in a waterway connected to an electrical conditioning system including a voltage regulator, and a load located on shore by means of a transmission cable.

FIG. 4 shows a typical energy capturing device located in a waterway 11 comprised of a prime mover 2, a shaft 3, and a generator 4. The prime mover 2 interacts with moving water 1 to cause linear motion or rotational motion of shaft 3 which in turn produces electrical energy from generator 4. The output from the generator 4 is connected to a passive rectifier 6, which is located at the generator, by means of conductor 5 to produce a variable voltage direct current (DC). The variable voltage direct current (DC) output of rectifier 6 is transmitted to voltage regulator 8 which is located on shore 12 by means of transmission cable 7. The output of voltage regulator 8 is a direct current (DC) bus 9 of fixed voltage. Load 10 is energized by direct current (DC) bus 9.

Figure 5:
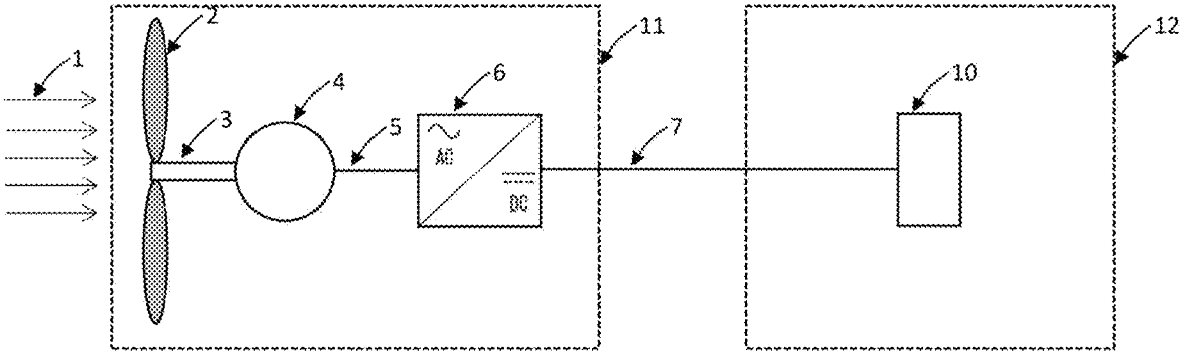
FIG. 5 shows an innovative assembly of an energy capturing device with an integrated generator and active rectifier in a waterway connected to a load that is also located in the waterway or on shore by means of a transmission cable.

FIG. 5 discloses an innovative energy capturing device and electrical conditioning system assembly located in a waterway 11 comprised of a prime mover 2, a shaft 3, a generator 4, and an active rectifier 6 connected to the generator 4 by means of conductors 5. The prime mover 2 interacts with moving water 1 to cause rotation of shaft 3 which in turn produces electrical energy from generator 4. The output from the generator 4 is connected to an active rectifier 6, which is integrated with the generator, by means of conductor 5 to produce a fixed voltage direct current (DC). The fixed voltage direct current (DC) output of active rectifier 6 is transmitted to load 10, located in a waterway or on shore at a distance 12, by means of transmission cable 7.

Figure 6:
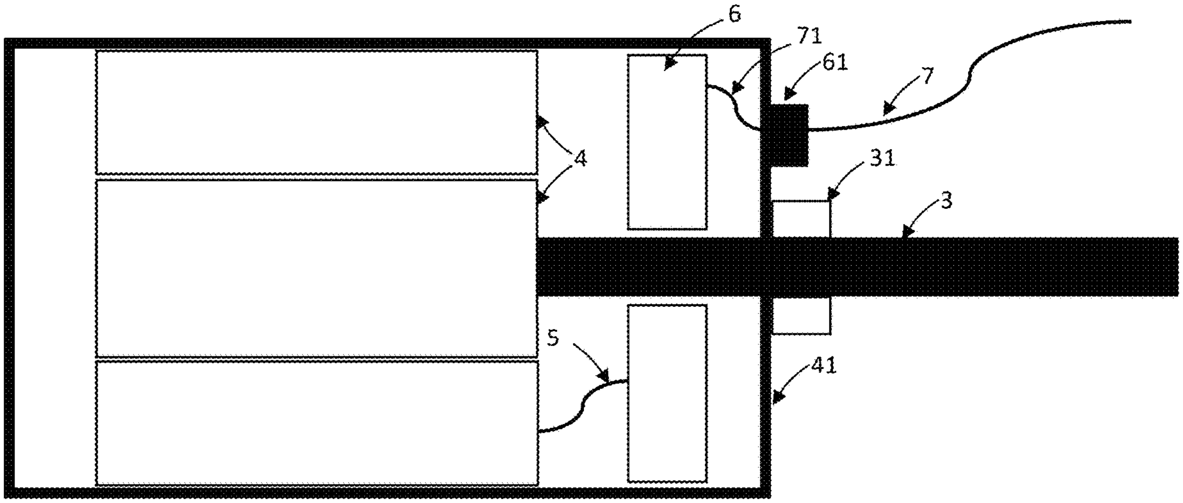
FIG. 6 shows a generator and an active rectifier, both integrated within a waterproof housing and a transmission cable connected to the exterior of that waterproof housing.

FIG. 6 discloses an innovative method of integrating an energy capturing device generator and active rectifier in an electrical conditioning system for use in waterways near the surface or below the surface of the waterway. Energy capturing device shaft 3 enters a waterproof enclosure 41 through a watertight seal 31 and connects to generator 4. Active rectifier 6 is also located within waterproof enclosure 41 and has input terminals connected to electrical generator 4 output terminals by conductor 5. Active rectifier 6 output terminals are connected to waterproof connector 61 by means of conductor 71. Transmission cable 7 is then connected to electrical connector 61 and within waterway fluid 11.

Figure 7:
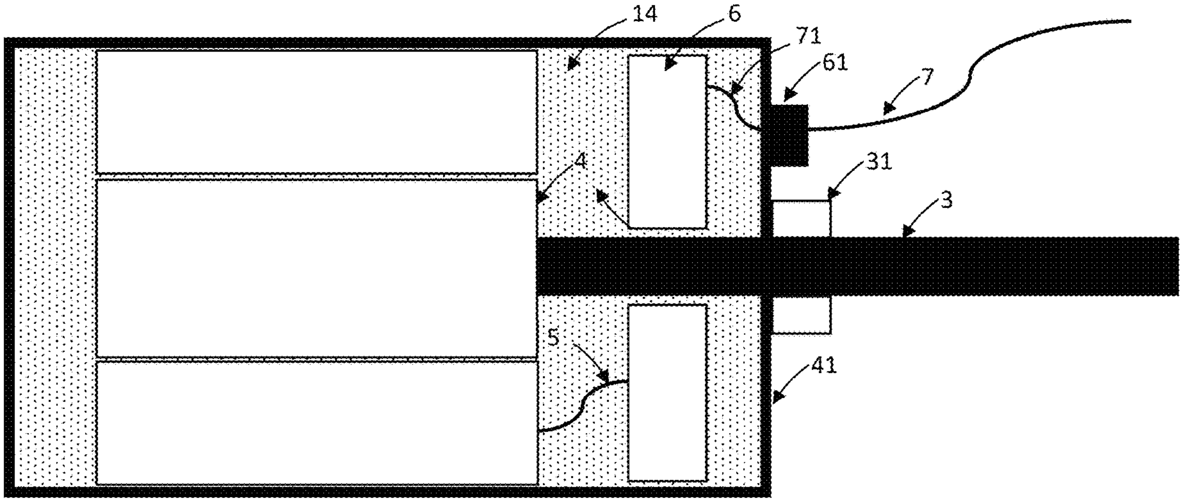
FIG. 7 shows a generator and an active rectifier, both integrated within a waterproof housing, filled with a low viscosity, thermally conductive, and electrically insulative fluid, and a transmission cable connected to the exterior of that waterproof housing.

FIG. 7 discloses an innovative method of integrating an energy capturing device generator and active rectifier in an electrical conditioning system for use in waterways near the surface or below the surface of the waterway. Energy capturing device shaft 3 enters a waterproof enclosure 41 through a watertight seal 31 and connects to generator 4. Active rectifier 6 is also located within waterproof enclosure 41 and has input terminals connected to electrical generator 4 output terminals by conductor 5. Active rectifier 6 output terminals are connected to waterproof connector 61 by means of conductor 71. Transmission cable 7 is then connected to electrical connector 61 and within waterway fluid 11. A low viscosity, thermally conductive, and electrically insulative fluid 14 is used to fill the cavity around generator 4, active rectifier 6, and conductors 5 and 71.

Specifically, described herein is the use of a low viscosity, electrically insulative and thermally conductive fluid, for example, a low viscosity, electrically insulative and thermally conductive liquid, to surround the generator and active rectifier.

While fluid can certainly be used to describe both gases and liquids, the thermal conductivity of gases is quite low compared to liquid and so gases were not considered as a viable fluid choice.

Furthermore, the Inventors have tested many different underwater generator designs and have found that gas filled cavities have a tendency to allow for water ingress with time due to their compressible nature; however, liquid filled cavities do not.

Examples of commonly available heat transfer fluids (thermally conductive) that are used in engineering sectors such as power generation, air-conditioning, chemical production, heating and cooling processes, electronic applications, transportation and microelectronics include for example water, oil, and ethylene/propylene glycol, ethyl/methyl alcohol.

We tested the electrical conductivity of ethyl alcohol and isopropyl alcohol, and found bubbles forming at the electrodes used to apply a voltage which clearly indicated electrical conductivity.

Additional research has demonstrated that oil is surprising the only practical fluid, that is, liquid, to fill the cavity. Examples of suitable oils include but are by no means limited to vegetable oils and low viscosity hydraulic oils.

| Fluid | Thermal Conductivity (W/mk) | Dynamic Viscosity (cP) | Dielectric constant |
|---|---|---|---|
| Alcohol, ethyl (ethanol) | 0.17 | 1.10 | 16.20 |
| Alcohol, methyl (methanol) | 0.20 | 0.56 | 33.00 |

-continued

| Fluid | Thermal Conductivity (W/mk) | Dynamic Viscosity (cP) | Dielectric constant |
|---|---|---|---|
| Alcohol, propyl | 0.16 | 1.92 | 18.00 |
| Ethylene Glycol | 0.26 | 16.20 | 37.00 |
| Hydraulic oil (Hydrex 15) | 0.29 | 11.00 | 1.90 |
| Vegetable Oil | 0.17 | 35.00 | 3.10 |
| Propylene glycol | 0.15 | 42.00 | 37.00 |
| Water, Fresh | 0.61 | 0.89 | 80.00 |
| Helium | 0.16 | 0.02 | 0.14 |
| Neon | 0.05 | 0.03 | 0.05 |
| Argon | 0.02 | 0.02 | 0.02 |
| Krypton | 0.01 | 0.03 | 0.01 |
| Xenon | 0.01 | 0.02 | 0.01 |
| Radon | 0.00 | 0.03 | 0.00 |
| Nitrogen | 0.03 | 0.02 | 1.00 |
| Carbon Dioxide | 0.02 | 0.01 | 1.60 |

According to an aspect of the invention, there is provided an energy capturing device comprising:

a generator for converting linear motion or rotational motion into alternating current electrical energy; and an electrical conditioning system comprising:

an input terminal;

an active rectifier; and an output terminal;

wherein the energy capturing device is configured such that alternating current electrical energy from the energy capturing device is passed to the input terminal of the electrical conditioning system, said alternating current electrical energy being converted on passing through the active rectifier to direct current electrical energy at the output terminal of the electrical conditioning system; and wherein the active rectifier and the generator are sealed in a waterproof housing, said waterproof housing being filled with a heat dissipating liquid having a thermal conductivity between 0.17 and 1.0 W/mK, a dynamic viscosity between 0 and 40 cP and a dielectric constant between 0 and 4 to dissipate heat from the active rectifier and the generator.

The heat dissipating liquid may be a vegetable oil, for example, any suitable oil derived from one or more plants having a thermal conductivity between 0.17 and 1.0 W/mK, a dynamic viscosity between 0 and 40 cP and a dielectric constant between 0 and 4, such as for example but by no means limited to canola oil, soybean oil and sesame oil.

Other suitable vegetable oils or plant-based oils can be readily determined through routine experimentation and are within the scope of the invention.

The heat dissipating liquid may be a low viscosity hydraulic oil, for example, a hydraulic oil having a dynamic viscosity between 4 and 40 cP.

In some embodiments, the active rectifier is affixed to the generator.

In some embodiments, the active rectifier and the generator sealed in the waterproof housing are submerged in a waterway.

The scope of the claims should not be limited by the preferred embodiments set forth in the examples but should be given the broadest interpretation consistent with the description as a whole.

The invention claimed is:

1. An energy capturing device comprising:

a generator for converting linear motion or rotational motion into alternating current electrical energy; and an electrical conditioning system comprising:

an input terminal;

an active rectifier; and an output terminal;

wherein the energy capturing device is configured such that alternating current electrical energy from the energy capturing device is passed to the input terminal of the electrical conditioning system, said alternating current electrical energy being converted on passing through the active rectifier to direct current electrical energy at the output terminal of the electrical conditioning system; and wherein the active rectifier and the generator are sealed in a waterproof housing, said waterproof housing being filled with a heat dissipating liquid consisting of an oil derived from one or more plants selected from the group consisting of canola oil, soybean oil and sesame oil, the heat dissipating liquid having a thermal conductivity between 0.17 and 1.0 W/mK, a dynamic viscosity between 0 and 40 cP and a dielectric constant between 0 and 4 to dissipate heat from the active rectifier and the generator.

2. The energy capturing device according to claim 1 wherein the active rectifier is affixed to the generator.

3. The energy capturing device according to claim 1 wherein the active rectifier and the generator sealed in the waterproof housing are submerged in a waterway.

* * * * *